Aug. 10, 1926.
S. S. BUNDY
DEHORNER
Filed April 23, 1924
1,595,542
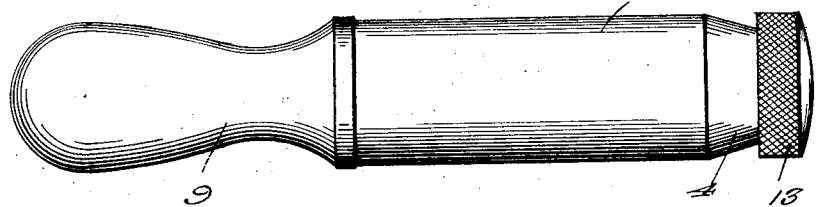
Fig. 1.
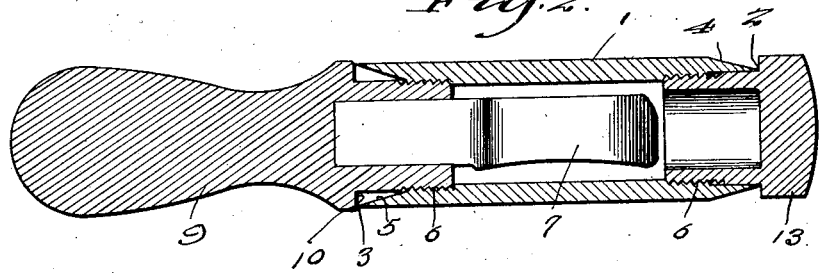
Fig. 2.
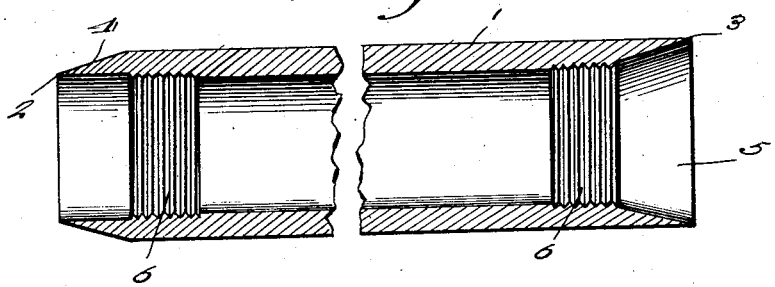
Fig. 3.
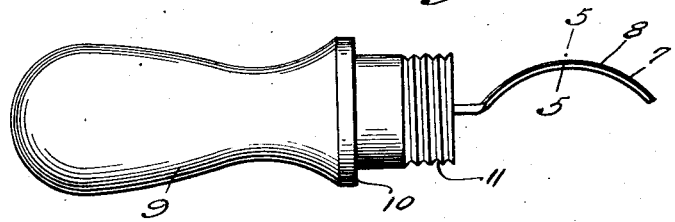
Fig. 4.
Fig. 5.
S. S. Bundy INVENTOR
BY Victor J. Evans
ATTORNEY
WITNESSES Patented Aug. 10, 1926.

1,595,542

UNITED STATES PATENT OFFICE.

STANTON S. BUNDY, OF ROOSEVELT, TEXAS.

DEHORNER.

Application filed April 23, 1924. Serial No. 708,507.

The object of my said invention is the provision of a device for expeditiously, humanely and effectively dehorning calves, lambs or goat kids.

To the attainment of the foregoing, the invention consists in the improvement as hereinafter described and definitely claimed.

In the accompanying drawings, forming part of this specification:—

Figure 1 is a side elevation of the dehorning instrument constituting the preferred embodiment of my invention.

Figure 2 is a longitudinal central section of the device.

Figure 3 is an enlarged broken longitudinal section better showing the construction of the end portions of the device body.

Figure 4 is a detail view illustrative of the blade and the handle therefor comprised in the device.

Figure 5 is a transverse section taken through the said blade in the plane indicated by the line 5—5 of Figure 4.

Similar numerals of reference designate corresponding parts in all of the views of the drawings.

Among other elements the device comprises a tubular body 1, formed of steel. The said tubular body is provided at its ends with circular cutting edges 2 and 3 of different diameters to suit horns of different sizes and it will also be noted that adjacent to its comparatively small cutting edge 2 the body 1 is exteriorly tapered at 4. Interiorly the body 1 is tapered at 5 to the large cutting edge 3, and it will also be noted that interiorly the body 1 is threaded as designated by 6 at two points, one thread being located adjacent to though spaced from the cutting edge 2, and the other thread being located immediately adjacent to the interior taper 5.

In addition to the body 1 the device comprises a curvilinear blade 7 with a longitudinal cutting edge 8, and a handle 9 to which the said blade is fixed and by which the blade is carried, the said handle 9 being shouldered at 10 and being threaded at 11. At this point I would have it understood that it is within the purview of my invention to form the handle 9 of any material appropriate to its purpose though I prefer to form the said handle of metal. I would also have it understood that the thread 11 of the handle is so disposed as to permit of the shoulder 10 abutting against either end of the tubular body 1 according to the end of the body in which the blade 7 and the threaded portion of the handle 9 are inserted. Manifestly when comparatively large horns are to be removed the handle is engaged with the small end of the body 1 while when small horns are to be removed the handle is engaged with the large end of the body 1.

In the practical use of the device the cylindrical or circular cutting edge that it is desired to use is applied against the head of the animal with the horn or horn button disposed in the center of the circle, and by pressing downwardly on the device and rotating the same the skin adjacent to the horn is cut through. After the above operation has been completed the blade 7 is then brought into use, the handle being firmly grasped and the horn and cartilage are extracted by a circular gouging motion, the blade of the knife following the cut and made as stated by the cylindrical or circular cutting edge employed. The curvilinear shape of the blade 7 is designed to render the said operation complete and thorough on one movement of the device.

It will be apparent from the foregoing that my novel dehorner is compact and easy to carry in such manner that all of its cutting edges are protected, and that in use the dehorner is not only adapted to extract horn but is also adapted to remove the underlying cartilage. The rapidity with which the device may be operated renders the operation humane and hence the extraction of the horn and cartilage may be accomplished when an animal is very young so that it is feasible to dehorn the animal early in the season before flies and worms become numerous.

In addition to the elements described, I prefer to have my novel device comprise a plug 13 adapted to be removably secured in the end of the body opposite to the handle with a view to exculding dust and grit from the interior of the body.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. A dehorning device comprising a tubular body having circular cutting edges of different diameters at its ends and also having interior threads adjacent to said ends, a handle removably threaded in one end of the body, and a curvilinear blade carried by the inner portion of the handle.

2. A dehorning device comprising a tubular body having circular cutting edges of different diameters at its ends and also having interior threads adjacent to said ends, a handle removably threaded in one end of the body, and a curvilinear blade carried by the inner portion of the handle; the said body being exteriorly tapered to its small cutting edge and interiorly tapered to its large cutting edge.

In testimony whereof I affix my signature.

STANTON S. BUNDY.